Sept. 13, 1938.    A. B. PIERRE ET AL    2,130,025
MEANS FOR SOAKING WOOD, LUMBER, AND THE LIKE
Filed Sept. 6, 1934    4 Sheets-Sheet 1
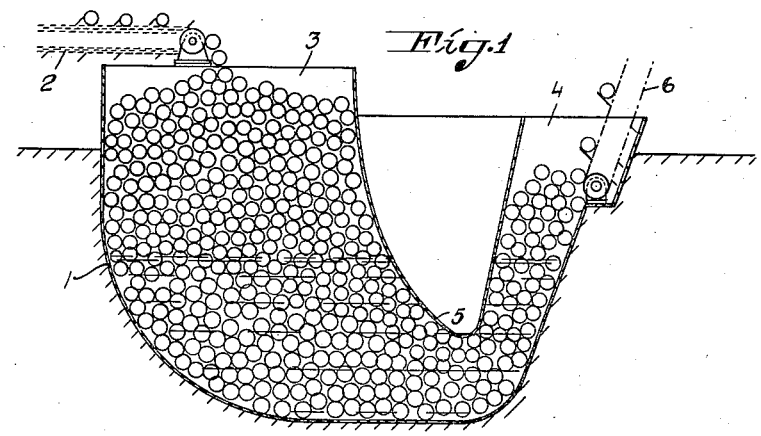
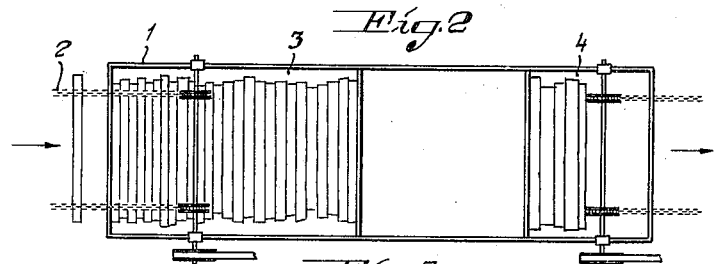
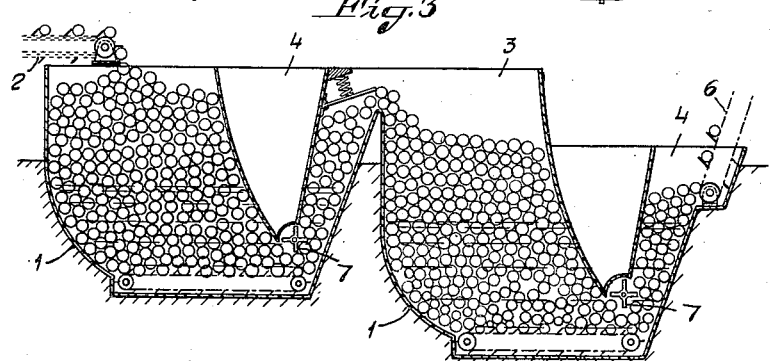
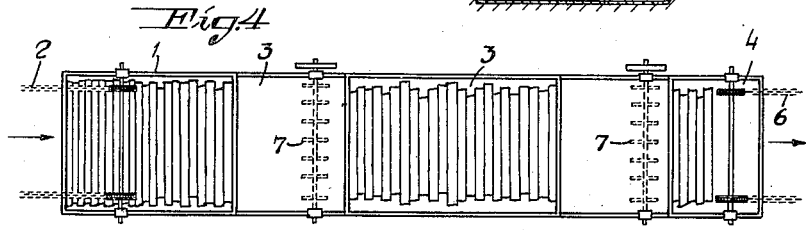
A. B. Pierre
A. G. Johansson
S. Bergström
INVENTORS
By: Marks & Clerk
ATTYS.

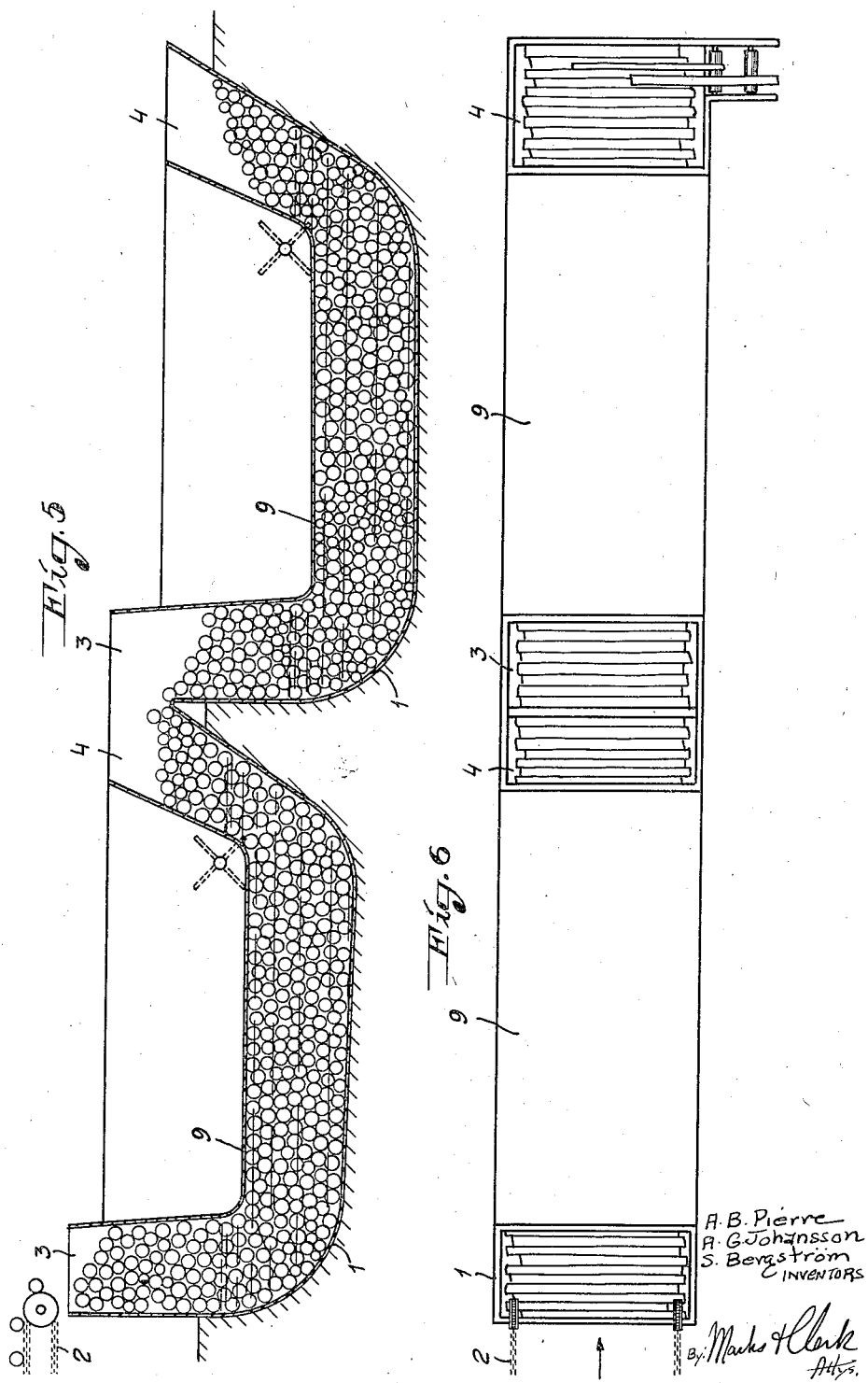

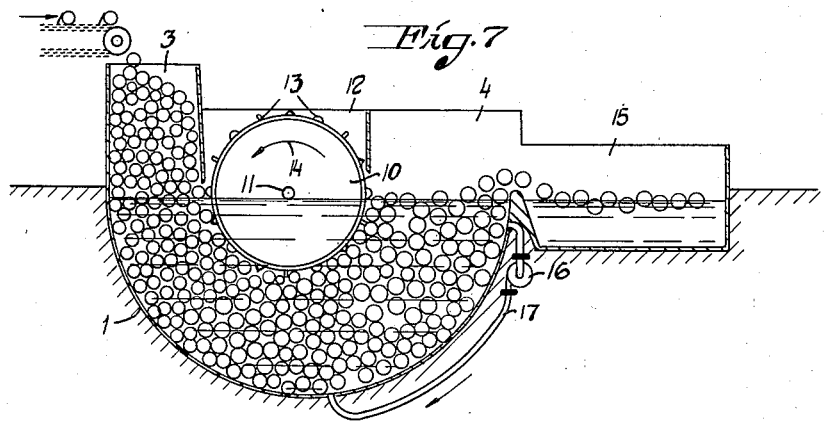
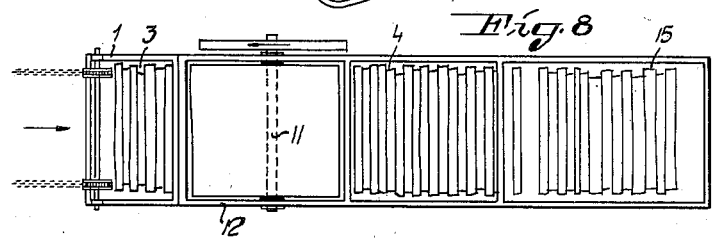
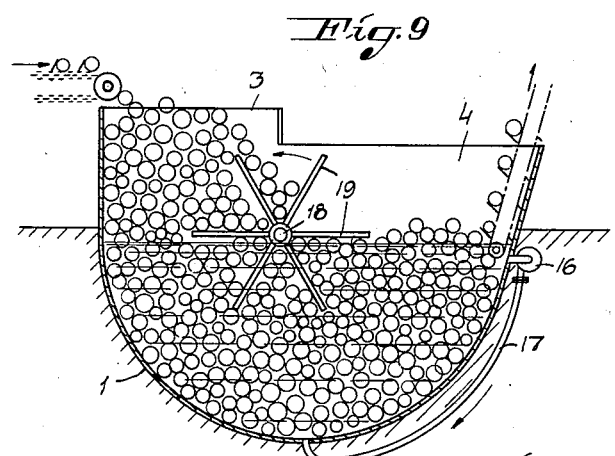
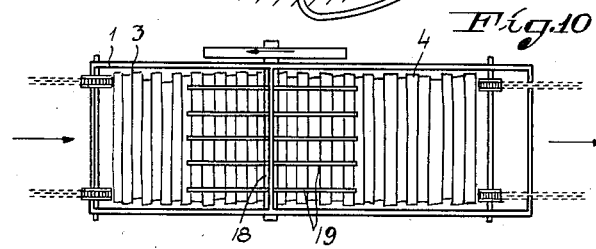

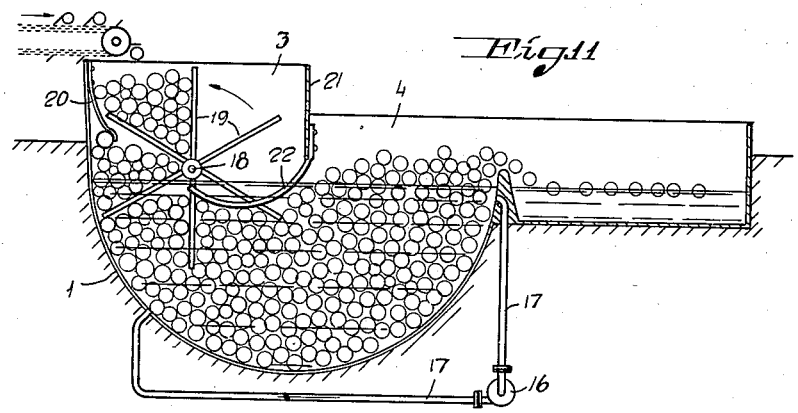
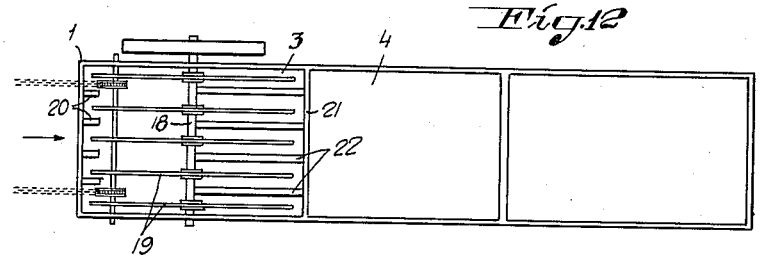
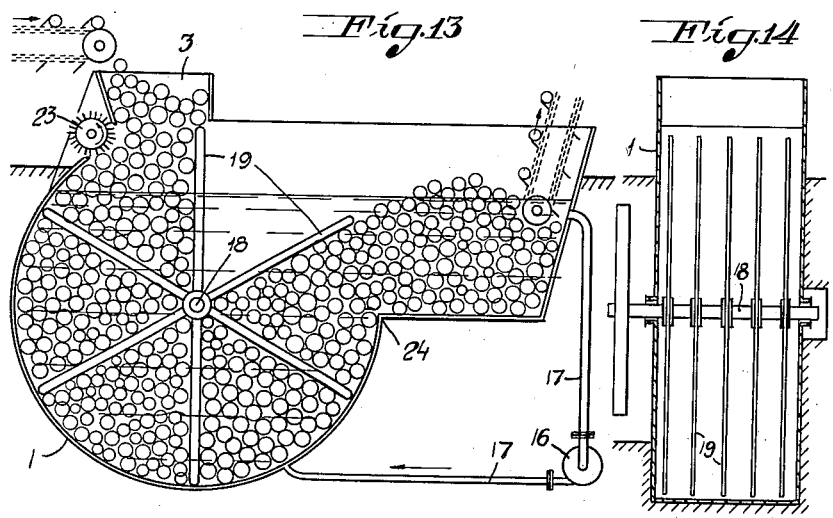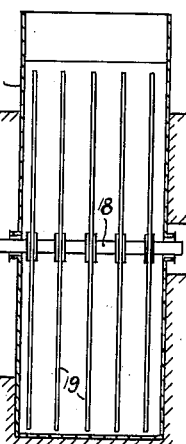

Patented Sept. 13, 1938

2,130,025

UNITED STATES PATENT OFFICE 2,130,025

MEANS FOR SOAKING WOOD, LUMBER, AND THE LIKE

Anders Bernhard Pierre, Jarpen, Axel Gustaf Johansson, Nalden, and Sten Bergström, Stockholm, Sweden Application September 6, 1934, Serial No. 743,022 In Sweden December 9, 1933

3 Claims. (Cl. 144—208)

For the purpose of disbarking wood, lumber and the like, a method has been practised hitherto, according to which the lumber would be subjected, prior to the actual disbarking operation, to wetting in water or other liquid, in order thereby to loosen the bark. To this end entirely open soaking boxes have mostly been used, through which the lumber would be fed from the one end or side of the box to the other, substantially in succession piece by piece. If in this manner it shall be possible to effect complete wetting of a great quantity of lumber at a time for a long period of time as required, the lumber being at the same time supplied and fed continuously, the boxes must be made very long. They will thus occupy much space while involving a high first cost. In other words, it will not be possible to fill into a soaking box of normal length of this kind lumber masses to an arbitrary depth. For either will then a portion of the floating lumber mass be located above the surface of the water so as not to be wetted, or, very bulky and expensive arrangements must be made use of, in order that the whole mass shall permit of being kept down below the surface of the liquid simultaneously with the feeding thereof.

The above-mentioned difficulties are obviated through the present invention, which refers to a soaking method and means therefor, which will be of little bulk only, the first cost of which is low, and which is simple and can be easily attended to, and which makes it possible to keep large quantities of lumber at a time completely submerged in the water for a sufficient period of time while the lumber is being continuously supplied and fed and also removed.

The method according to the invention is principally characterized by the feature that the lumber is introduced preferably successively, into one of two or more basins (pits or the like) communicating with each other below the surface of the liquid, or into one of two or more communicating compartments of one and the same basin, in such a quantity that overlying lumber layers therein will by their weight press or aid toward pressing underlying lumber under the surface of the liquid and further over into another basin or basin compartment, where the lumber is allowed successively to rise out of the liquid.

The means intended for carrying the method into effect is principally characterized by the same consisting of a basin, soaking box (pit or the like) which is provided with a guiding means or the like, between an intake compartment or intake opening and an outtake compartment or outtake opening for the lumber, such guiding means or the like being so devised that lumber introduced through the intake compartment and actuated by the guiding means and by the lumber pressing on from behind must go down to a certain depth in the basin, in order to be able to pass in the latter to the outtake compartment.

The basin is preferably made of a great depth relatively to the length, for instance of a depth at least the half or three quarters of the length. The guiding means actuating the lumber may consist either of a beam or partition depending into the basin between the intake and outtake compartments, the lower edge or lower end of said beam or partition being located at a distance from the bottom of the basin, or, an upper side (roof) of the basin extending between the intake and outtake compartments, or a portion of such upper side, may be formed as a guide and be so located relatively to the surface of the liquid that the lumber is forced down under the surface of the liquid when passing along beneath the said upper side.

Suitable feeding devices may be operable in a manner to be described more closely hereinbelow for the passing of the lumber through the basin from the intake compartment to the outtake compartment.

The accompanying drawings illustrate various examples of embodiment of the invention. Figs. 1 and 2 show a vertical section and a plan view respectively of a basin arranged according to the invention. Figs. 3 and 4 show a vertical section and a plan view respectively of two basins arranged behind each other. Figs. 5 and 6 also show a vertical section and a plan view respectively of two basins arranged behind each other, these basins, however, being of another shape than those illustrated in Figs. 3 and 4. Figs. 7 and 8 are a vertical section and a plan view respectively of a basin having a cylindrical rotary body therein, which body may facilitate the passing of the lumber from the intake compartment to the outtake compartment. Figs. 9 and 10 are a vertical section and a plan view respectively of a basin having a rotary body consisting of a shaft and arms projecting therefrom. Figs. 11 and 12 show a vertical section and a plan view respectively of a basin provided with a rotary body consisting of a shaft and arms projecting therefrom, said body being arranged in the intake compartment of the basin. Figs. 13 and 14 show two vertical sections, taken at right angles to each other, of a basin provided with a rotary body consisting of a shaft and arms projecting therefrom, said body being arranged in the intake compartment of the basin.

According to Fig. 1, 1 designates a basin or soaking box of a comparatively great depth relatively to the length thereof, into the intake compartment 3 of which basin the lumber will fall, preferably from a conveyor 2 provided for the conveyance thereof. Depending between the intake compartment 3 and the outtake compartment 4 is a partition or beam 5, the lower edge or end of which is located at a distance from the bottom of the basin. The deep basin may receive a great number of lumber pieces at a time, such lumber being piled and pressed downwardly, according as the lumber is introduced, under the influence of the weight of the overlying lumber. The whole quantity of lumber will then be soaked to the same extent for the purpose of loosening the bark, inasmuch as every piece of lumber must pass underneath the beam 5 prior to reaching the outtake compartment 4, whereupon the pieces of lumber float upwardly through the outtake compartment. On having reached the surface of the liquid in the outtake compartment 4 the lumber is removed by means of a conveyor 6 or in some other manner.

In order to facilitate the passage of the lumber past the lower edge of the beam 5, the latter is preferably tapering downwardly, as shown in the drawing, and rounded at its lower end, and in order still more to facilitate said passage, the lower edge of the beam may be provided with a feeding device, preferably in the form of a tumbler 7, shown in Figs. 3–5. The tumbler may consist of arms projecting freely from a driven shaft, or a number of arms secured to the shaft along the same may be mutually connected at their outer ends by means of rods consisting preferably of pipes parallel to the axis of the tumbler, that is to say parallel to the pieces of lumber fed by the tumbler, so that the rods may penetrate between the individual pieces of the lumber mass in order to keep such pieces in good order relatively to each other. The beam 5 or the feeding device connected therewith, or both of them, may be adjustable in the vertical direction, so that the size of the intermediate space between the beam and the bottom of the basin can be controlled. The beam or beams together with the feeding device (the tumbler) may, if desired, also be adjustable in the horizontal direction. Instead of being connected with or being carried by the basin the guiding means may of course be carried by a frame or the like outside the basin. The guiding means may also be driven in such a manner as to move continuously or intermittently in the vertical or horizontal direction, or in both ways. Also, the liquid in the basin may be given a pulsating or circulating movement by a suitable arrangement.

The passage of the lumber from the intake to the outtake compartment is also promoted by the distance between the opposed basin walls sectioned in the drawings being greater at the bottom than at the top in the intake compartment, whereas the distance between the opposed walls of the outtake compartment is greater at the top than at the bottom. For the last-mentioned purpose the bottom of the basin may also, if desired, be inclined from the intake compartment toward the outtake compartment.

According to Figs. 3 and 4, two or more basins arranged in the manner above described may be disposed behind each other in such a manner that lumber may be passed from the first basin to the next basin, for which purpose a conveyor may be provided between the two basins. It is more suitable, however, to dispose the basins relatively to each other as shown in Fig. 3, so that lumber coming from the outtake compartment of the first basin may float automatically over into the intake compartment of the succeeding basin.

The first one of two basins located behind each other may contain sulphite lye, an acid mixture, hot water or the like, for example, in order to bring about proper loosening of the bark, while the succeeding basin contains pure water or other liquid, by means of which the lye or acid entrained with the lumber from the first basin may be removed, or by means of which the lumber is cooled if it has been heated in the first basin. If desired, two or more basins may also be arranged beside one another, and may in such case also have a suitable conveying means between the basins.

The arrangement according to Figs. 5 and 6 differs from that shown in Figs. 3 and 4 substantially in that the guiding means provided between the intake compartment 3 and the outtake compartment 4 consists of the lowered roof 9 of the basin. Moreover, the basins according to Figs. 5 and 6 are located behind one another in such a manner that lumber coming from the outtake compartment of the first basin may pass over automatically into the intake compartment of the other basin. As the basins are located behind one another according to Figs. 3 and 4 or 5 and 6, the second basin in the succession must be situated lower down than the first one, as will be seen from the drawings, which arrangement has for its object to permit loading of the intake compartment of the succeeding basin with a quantity of lumber equal or substantially equal to that of the intake compartment of the first basin, that is to say with so large a quantity of lumber as is required to press down the underlying lumber in the liquid.

In the embodiment shown in Figs. 7 and 8, 1 denotes the basin with the intake and outtake compartments 3 and 4 respectively. Mounted between the two compartments is the rotary body 10, the shaft 11 of which extends through the basin wall 12 with a tight fit, if desired, the said shaft being rotatably arranged in or outside the walls 12. The rotary body in this case forms a cylindrical drum, the outside of which is provided with carriers 13 preferably of the shape shown in the drawings.

The rotary body, which is supposed to move in the direction of the arrow 14, may be connected to a special driving means, or may be loosely rotatable. In the first case it will exert with its surface, preferably provided with carriers, a pulling action on the pieces of lumber introduced into the intake compartment, so that such pieces will be moved, either solely through said action or through said action in cooperation with the pressure of the overlying lumber, successively down under the surface of the liquid in the basin, the cooperation between the drum and the lumber pressure being then so much more effective as no jamming of lumber can take place between the drum and the opposite fixed basin wall. After the lumber has been brought down the same is pressed further forwards through the basin toward the outtake compartment 4 while being still kept below the surface of the liquid by the rotary body. According as the pieces of lumber float upwardly in the outtake compartment they are removed either by floating by themselves or by being passed by means of a suitable conveyor to a special receptacle 15.

In case the rotary body 10 is not driven but is arranged to be freely rotated, it will be actuated by the pressure of the overlying lumber introduced into the intake compartment, and will thus be brought into rotation so as to exert a guiding action on the mass of lumber, so that the latter is kept down below the surface of the liquid while passing forwardly toward the outtake compartment. In this case, too, the rotating drum prevents jamming of the lumber between the drum and the opposite wall.

To facilitate the passing of the lumber through the basin, the bottom of the latter is of a uniform arcuate shape, and the rotary body is so mounted relatively to said bottom that the distance between both increases uniformly from the intake compartment to the outtake compartment. In order furthermore to promote the movement of the mass of lumber toward the outtake compartment, there may be provided a pump 16 outside the basin, said pump communicating with the basin through a circulation conduit 17 and causing the liquid of the basin to stream toward the outtake compartment.

The circulation conduit may also be connected with some other part of the basin, for instance with the inlet thereof, instead of being connected with the bottom of the basin as shown in the drawings.

The circulation of the liquid through the basin may also be effected by leading in the liquid through the inlet and causing it to flow off continuously at the outlet or elsewhere.

It is to be observed particularly in connection with the forms shown in Figs. 1, 3, 5 and 7 that in each instance the intake and outtake is situated at the opposite ends of the basin and include walls inclined slightly to the vertical and form substantial continuations of the inner and outer walls of the basin, the horizontal cross section thereof between the intake and the middle part of the passage increasing toward the passage while the horizontal cross section defined by the outtake walls of the basin decrease from the outtake to the passage. The intake in each instance is situated at a higher level than the outtake and due to this fact and the novel cross sectional shape just defined, when a large quantity of material in the form of logs for instance is piled in the intake the weight thereof causes the material to practically automatically travel through the free passage from the intake to the outtake.

Attention is also directed to the fact that in the form shown particularly in Figs. 1 and 2 the basin is definitely constructed with inner and outer walls the ends of which are shaped to define the intake and the outtake, the inner wall being slightly rounded at its lowermost point and this point constitutes the guide means which forms the free passage between the intake and the outtake. The inner wall may thus be formed of one continuous piece as shown in Fig. 1 with a curved medial portion or it may be formed in sections with the medial section in the form of a rotatable member such as a drum as shown in Fig. 7.

In the embodiment according to Figs. 9 and 10, the rotary body is also mounted between the intake and outtake compartments 3 and 4 of the basin, and consists of a shaft 18 with arms 19 projecting therefrom. It will be seen from the drawings how the pieces of lumber introduced into the intake compartment 3 fall in between the arms 19. If the rotary body is driven, the lumber will be pressed upon downwardly by the arms and entrained down below the surface of the liquid and moved forwards towards the outtake compartment 4. If the rotary body is arranged to rotate freely, only the lumber introduced into the intake compartment will act to rotate the rotary body, in which case it also forces the pieces of lumber down below the surface of the liquid and thus keeps them submerged while they pass forwardly toward the outtake compartment 4. In this case, too, the bottom of the basin 1 is arcuate and so situated relatively to the rotary body that the distance between both is increased from the intake compartment to the outtake compartment. The pump 16 with the circulation conduit 17 in this case also brings about a flow of the liquid toward the outtake compartment.

In the embodiment according to Figs. 11 and 12, the rotary body is arranged in the intake compartment 3 and consists of a shaft 18 with arms 19 projecting therefrom. Here, too, the lumber introduced into the intake compartment falls in between the arms 19 and will be pressed upon and entrained downwardly if the rotary body is being driven, or will exert a rotating effect on the rotary body by the overpressure of the wood, in case the rotary body is arranged to rotate freely. Arranged between the arms and the wall of the intake compartment where the arms 19 move downwardly are fixed guides 20 preventing the lumber from being jammed between the wall and the outer ends of the arms. On that side of the intake compartment 3 where the arms 19 move upwardly there are arranged downwardly arcuate guides 22 between the shaft 18 and the lower edge of a wall 21 provided between the intake and outtake compartments, which guides 22 partly aid toward keeping the lumber below the surface of the liquid, partly prevent the entraining of the lumber upwardly by the arms, and partly prevent jamming of the lumber between the outer ends of the arms and the wall 21. In this case, too, the distance between the arcuate bottom of the basin and the rotary body is increased in a direction from the intake to the outtake compartment, and by means of the pump 16 and the conduits 17 the liquid in the basin may be caused to flow toward the outtake compartment.

In the embodiments according to Figs. 13 and 14, the rotary body is arranged in the intake compartment which is of such a shape as to be connected concentrically to the outer path of movement of the rotary body. The rotary body here also consists of a shaft 18 with arms 19, and the mode of operation will be substantially as previously described, insofar as the lumber introduced into the intake compartment 3 falls in between the arms 19 so as to be entrained downwardly also by the latter, if the rotary body is arranged to be driven, or which lumber has a rotating effect on the rotary body in case the latter is arranged to rotate freely, the lumber being in both cases kept constantly below the surface of the liquid while passing toward the outtake compartment. At the point of the intake compartment where the arms 19 commence to move downwardly along the concentric wall there is arranged a roller 23 adapted to prevent jamming of the lumber between the ends of the arms and the inside of the wall. In the outtake compartment 4 the lumber floats upwardly as soon as it has passed the corner 24, where the wall of the intake compartment ceases to be concentric to the rotary body. From the said corner the wall is flared in the manner shown in the drawings and forms the outtake compartment, in which the lumber floats up as soon as it can pass freely upwardly without being impeded by arms 19. Here, too, a pump 10 with a circulation conduit 17 is preferably used to cause the liquid in the basin to flow toward the outtake compartment.

What we claim is:—

1. Apparatus for soaking wood, lumber and similar material, comprising a basin for a soaking liquid having an intake and an outtake, guiding means between said intake and outtake, said means comprising a rotatable horizontal cylinder, which is spaced from the bottom of the basin to provide an unobstructed passage for the wood extending from the intake below said drum to the outtake, the peripheral surface of said cylinder forming substantially the entire upper limiting means of the said passage, the wall of the basin lying opposite to said surface of the cylinder being curved at least approximately in conformity with said surface, the distance between the cylinder and the curved bottom increasing successively from the intake to the outtake.

2. Apparatus for soaking wood, lumber and similar material, comprising a basin for a soaking liquid having an intake and an outtake, guiding means between said intake and outtake, said means comprising a rotatable horizontal cylinder, which is spaced from the bottom of the basin to provide an unobstructed passage for the wood extending from the intake below said cylinder to the outtake, the peripheral surface of said cylinder forming substantially the entire upper limiting means of the said passage, the wall of the basin lying opposite to the said cylinder surface being curved, at least approximately, in conformity with said surface, said intake and outtake having each two lateral walls, an outer wall, and an inner wall, the inner walls preventing the logs from falling upon the upper part of the cylinder, said passage, said intake and outtake being so shaped as to allow such quantities of material to be piled up therein as to cause the material to travel through the free passage from the intake to the outtake under the action of pressure from material piled up in the intake and to cause said passage to be essentially filled with material below the liquid level therein under the action of pressure from material piled up in the outtake.

3. Apparatus for soaking wood, lumber and similar material comprising a basin for a soaking liquid having an intake and an outtake, guiding means between said intake and outtake, said guiding means comprising a freely rotatable cylindrical body which is spaced from the inside of the bottom of the basin to provide an unobstructed passage for the wood extending from the intake below the rotatable body and to the outtake, said body forming substantially the entire upper limiting means of the portion of the free passage lying below the liquid level, the distance between the rotatable body and the bottom of the basin increasing successively from the intake to the outtake, the intake having a rigid inner wall, which prevents the logs in the intake from moving therefrom over the rotatable body to the outtake, and the outtake having a rigid inner wall to prevent the logs in the outtake from moving therefrom over the rotatable body to the intake.

ANDERS BERNHARD PIERRE.
AXEL GUSTAF JOHANSSON
STEN BERGSTRÖM.